US010890369B2

(12) United States Patent
Liu et al.

(10) Patent No.: US 10,890,369 B2
(45) Date of Patent: Jan. 12, 2021

(54) REFRIGERATING AND FREEZING DEVICE

(71) Applicant: QINGDAO HAIER JOINT STOCK CO., LTD., Qingdao (CN)

(72) Inventors: Haoquan Liu, Qingdao (CN); Bo Jiang, Qingdao (CN); Liyan Wang, Qingdao (CN); Ruowu Xin, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 205 days.

(21) Appl. No.: 16/302,089

(22) PCT Filed: Feb. 23, 2017

(86) PCT No.: PCT/CN2017/074604
§ 371 (c)(1),
(2) Date: Nov. 15, 2018

(87) PCT Pub. No.: WO2017/219694
PCT Pub. Date: Dec. 28, 2017

(65) Prior Publication Data
US 2019/0145691 A1 May 16, 2019

(30) Foreign Application Priority Data

Jun. 20, 2016 (CN) .......................... 2016 1 0443121

(51) Int. Cl.
*F25D 21/12* (2006.01)
*C01B 21/04* (2006.01)
(Continued)

(52) U.S. Cl.
CPC ......... *F25D 17/042* (2013.01); *B01D 53/047* (2013.01); *B01D 53/053* (2013.01);
(Continued)

(58) Field of Classification Search
CPC .... B01D 53/04; B01D 53/047; B01D 53/053; B01D 2253/102; B01D 2253/116;
(Continued)

(56) References Cited

U.S. PATENT DOCUMENTS 4,142,372 A * 3/1979 Kato ...................... A23B 7/148
62/78
5,063,753 A * 11/1991 Woodruff .............. A23L 3/3418
62/239

(Continued)

FOREIGN PATENT DOCUMENTS

CN 1238445 A 12/1999
CN 101000191 A 7/2007
(Continued)

OTHER PUBLICATIONS

Machine-generated English translation of JP 2010-149993 A, published Jul. 2010.*

*Primary Examiner* — Frank M Lawrence, Jr.
(74) *Attorney, Agent, or Firm* — Cheng-Ju Chiang

(57) ABSTRACT

The present invention provides a refrigerating and freezing device. A first sealed space and a second sealed space are disposed in a storage space inside the refrigerating and freezing device. The refrigerating and freezing device is further provided with a nitrogen generation device, which comprises an adsorption device and an air compressor that supplies compressed air for the adsorption device. The adsorption device utilizes the compressed air to prepare nitrogen that is provided for the first sealed space and an oxygen-enriched gas that is provided for the second sealed space. The freshness preservation capability of the first sealed space is improved. The bioactivity of food in the second sealed space is guaranteed.

8 Claims, 4 Drawing Sheets

(51) Int. Cl.
*F25D 17/04* (2006.01)
*F25D 23/12* (2006.01)
*B01D 53/047* (2006.01)
*B01D 53/053* (2006.01)

(52) U.S. Cl.
CPC ...... *C01B 21/0444* (2013.01); *C01B 21/0461* (2013.01); *F25D 17/045* (2013.01); *F25D 23/126* (2013.01); *B01D 2253/102* (2013.01); *B01D 2253/116* (2013.01); *B01D 2256/10* (2013.01); *B01D 2257/104* (2013.01); *B01D 2258/06* (2013.01); *B01D 2259/402* (2013.01); *B01D 2259/40035* (2013.01); *C01B 2210/0017* (2013.01); *C01B 2210/0045* (2013.01); *F25D 2317/061* (2013.01)

(58) Field of Classification Search
CPC ............ B01D 2256/10; B01D 2256/12; B01D 2257/102; B01D 2257/104; B01D 2258/06; B01D 2259/40035; B01D 2259/402; C01B 21/0444; C01B 21/0461; C01B 2210/0017; C01B 2210/0045; F25D 17/042; F25D 17/045; F25D 23/126; F25D 2317/061
USPC ........ 96/121, 130, 134, 143; 62/440; 99/474
See application file for complete search history.

(56) References Cited

U.S. PATENT DOCUMENTS 5,649,995 A * 7/1997 Gast, Jr. ................ A23L 3/3418
426/419
2010/0269525 A1* 10/2010 Wang ..................... A23B 7/148
62/179

FOREIGN PATENT DOCUMENTS

| CN | 103090620 A | 5/2013 |
| CN | 105674676 A | 6/2016 |
| CN | 106115637 A | 11/2016 |
| JP | 4192337 B2 | 12/2008 |
| JP | 2010-149993 A * | 7/2010 |

* cited by examiner

REFRIGERATING AND FREEZING DEVICE

CROSS REFERENCE TO RELATED APPLICATIONS

The present application is a 35 U.S.C. § 371 National Phase conversion of International (PCT) Patent Application No. PCT/CN2017/074604, filed on Feb. 23, 2017, which further claims benefit of Chinese Patent Application No. 201610443121.2, filed on Jun. 20, 2016, the disclosure of which is incorporated by reference herein. The PCT International Patent Application was filed and published in Chinese.

TECHNICAL FIELD

The present invention relates to the field of article storage and in particular to a refrigerating and freezing device.

BACKGROUND

With the continuous improvement of people's living standards, aquatic products have gradually stepped onto people's dining tables. Fresh and live aquatic products can be seen everywhere even in inland regions off the coast. A traditional household refrigerator generally can only realize freezing freshness preservation of the aquatic products. That is, at a low temperature, especially a temperature below minus 10° C., water in the aquatic products is frozen to form an environment in which bacteria can neither grow nor develop. Thus, refrigerating freshness preservation of the aquatic products is realized.

However, freezing freshness preservation only delays oxidation of the aquatic products rather than guarantees their survival, thus inevitably leading to a decrease of freshness. In addition, after the aquatic products are refrigerated and frozen, the nutritional value thereof will decrease. Besides, the frozen aquatic products will take a long time to thaw before cooking. The nutritional value of the aquatic products will get lost again during this thawing process. Therefore, the traditional refrigerator not only is increased in time cost, but also causes a great loss of the nutritional value of the aquatic products and decrease of the freshness, thereby affecting the quality of food.

SUMMARY

In view of the above-mentioned problem, the present invention provides a refrigerating and freezing device to conveniently solve the whole or at least part of the problem.

A further objective of the present invention is to enable the refrigerating and freezing device to maintain the bioactivity of food.

Another objective of the present invention is to miniaturize a nitrogen generation device of the refrigerating and freezing device.

According to one aspect of the present invention, there is provided a refrigerating and freezing device, comprising a cabinet body and a nitrogen generation device. A storage compartment is provided in the cabinet body. A first sealed space and a second sealed space are formed in the storage compartment. The nitrogen generation device comprises an adsorption device and an air compressor that supplies compressed air for the adsorption device in a controlled manner. The adsorption device is communicated with the first sealed space or the second sealed space in a controlled manner. The nitrogen generation device is configured to: supply the compressed air for the adsorption device, communicate the adsorption device with the first sealed space so as to enable the adsorption device to prepare nitrogen and to provide the prepared nitrogen for the first sealed space, and communicate the adsorption device with the second sealed space after stopping supplying the compressed air for the adsorption device so as to enable the adsorption device to desorb an oxygen-enriched gas and to provide the desorbed oxygen-enriched gas for the second sealed space.

Alternatively, the adsorption device further comprises a first barrel and a second barrel. A first adsorption room and a nitrogen room that are isolated from each other are provided in the first barrel. The nitrogen room is communicated with the first sealed space. A second adsorption room and an air room that are isolated from each other are provided in the second barrel. The air compressor is communicated with the air room through an air inlet pipe so as to supply the compressed air for the air room in a controlled manner. Carbon molecular sieves are disposed in the first adsorption room and the second adsorption room. The air room alternately supplies the compressed air for the first adsorption room and the second adsorption room in a controlled manner. When either of the first adsorption room and the second adsorption room adsorbs the oxygen-enriched gas to prepare nitrogen, the other thereof desorbs the carbon molecular sieves which have finished adsorption. The adsorption room that prepares the nitrogen is communicated with the nitrogen room. The adsorption room that performs desorption is communicated with the second sealed space.

Alternatively, the nitrogen generation device further comprises a gas path reversing valve provided with five gas delivery ports. A first gas delivery port is communicated with the first adsorption room. A second gas delivery port is communicated with the second adsorption room. A third gas delivery port is communicated with the air room. The gas path reversing valve is further configured to that the third gas delivery port is alternately communicated with the first gas delivery port and the second gas delivery port. When the third gas delivery port is communicated with the first gas delivery port, a fourth gas delivery port is communicated with the second gas delivery port, the air room supplies the compressed air for the first adsorption room, and the oxygen-enriched gas desorbed by the second adsorption room is discharged through the fourth gas delivery port. When the third gas delivery port is communicated with the second gas delivery port, a fifth gas delivery port is communicated with the first gas delivery port, the air room supplies the compressed air for the second adsorption room, and the oxygen-enriched gas desorbed by the first adsorption room is discharged through the fifth gas delivery port.

Alternatively, the nitrogen generation device further comprises a three-way pipe communicated between the fourth gas delivery port and the fifth gas delivery port and configured to merge the two gas delivery ports into an oxygen-enriched gas discharge port.

Alternatively, the nitrogen generation device further comprises a three-way solenoid valve provided with three vents. A first vent is communicated with the oxygen-enriched gas discharge port through an oxygen-enriched gas output pipe. A second vent is communicated with the second sealed space. A third vent is communicated with outside air of the refrigerating and freezing device. The first vent is selectively communicated with the second vent or the third vent. The oxygen-enriched gas is conveyed into the second sealed space when the first vent is communicated with the second vent. The oxygen-enriched gas is discharged to the outside air when the first vent is communicated with the third vent.

Alternatively, the nitrogen generation device further comprises a connecting pipe communicated with the first adsorption room and the second adsorption room, and a pressure equalizing valve connected in series with the connecting pipe and configured to unblock the connecting pipe when either of the first adsorption room and the second adsorption room stops adsorption and prepares to desorb, such that air pressures inside the first adsorption room and the second adsorption room are equalized.

Alternatively, the nitrogen generation device further comprises a first gas outlet pipe communicated with the first adsorption room and the nitrogen room, a second gas outlet pipe communicated with the second adsorption room and the nitrogen room, and two one-way valves respectively disposed on the first gas outlet pipe and the second gas outlet pipe and configured to allow a gas to unidirectionally flow toward the nitrogen room from the first adsorption room or the second adsorption room, such that the gas in the nitrogen room is prevented from backflow.

Alternatively, the nitrogen generation device further comprises an oil-water separator disposed on the air inlet pipe and configured to filter the air that enters the air room.

Alternatively, the first barrel and the second barrel are disposed in the refrigerating and freezing device side by side. One end of the first adsorption room and one end of the second adsorption room are disposed in the same direction.

The present invention provides the refrigerating and freezing device. The first sealed space and the second sealed space are disposed in a storage space inside the refrigerating and freezing device. The refrigerating and freezing device is further provided with the nitrogen generation device. The nitrogen generation device comprises the adsorption device and is configured to: supply the compressed air for the adsorption device, communicate the adsorption device with the first sealed space so as to enable the adsorption device to prepare nitrogen and to provide the prepared nitrogen for the first sealed space, and communicate the adsorption device with the second sealed space after stopping supplying the compressed air for the adsorption device so as to enable the adsorption device to desorb the oxygen-enriched gas and to provide the desorbed oxygen-enriched gas for the second sealed space. According to the refrigerating and freezing device, the oxygen-enriched gas is supplied for the second sealed space to increase the content of oxygen in the second sealed space. Thus, the refrigerating and freezing device may guarantee the bioactivity of food in the second sealed space.

In addition, as the nitrogen is charged into the first sealed space, the freshness preservation capability of the first sealed space is improved. The nitrogen produced by the nitrogen generation device and the residual oxygen-enriched gas are respectively for freshness preservation and life keeping of the refrigerating and freezing device. The function of the nitrogen generation device is fully utilized. The raw material, namely air, is saved.

Further, according to the nitrogen generation device of the refrigerating and freezing device, the first adsorption room and the nitrogen room are integrated into the first barrel, and the second adsorption room and the air room are integrated into the second barrel, such that the structure of the nitrogen generation device is simplified. Since the main body of the whole nitrogen generation device consists of the two barrels only, the nitrogen generation device is miniaturized to be conveniently disposed in a storage device.

Through the following detailed description of the specific embodiments of the present invention with reference to the drawings, those skilled in the art will understand the above and other objectives, advantages and features of the present invention more clearly.

BRIEF DESCRIPTION OF THE DRAWINGS

The followings will describe some specific embodiments of the present invention in detail in an exemplary rather than restrictive manner with reference to the accompanying drawings. The same reference signs in the drawings represent the same or similar parts. Those skilled in the art shall understand that these drawings may not be necessarily drawn according to the scales. In the drawings.

DETAILED DESCRIPTION

Figure 1:
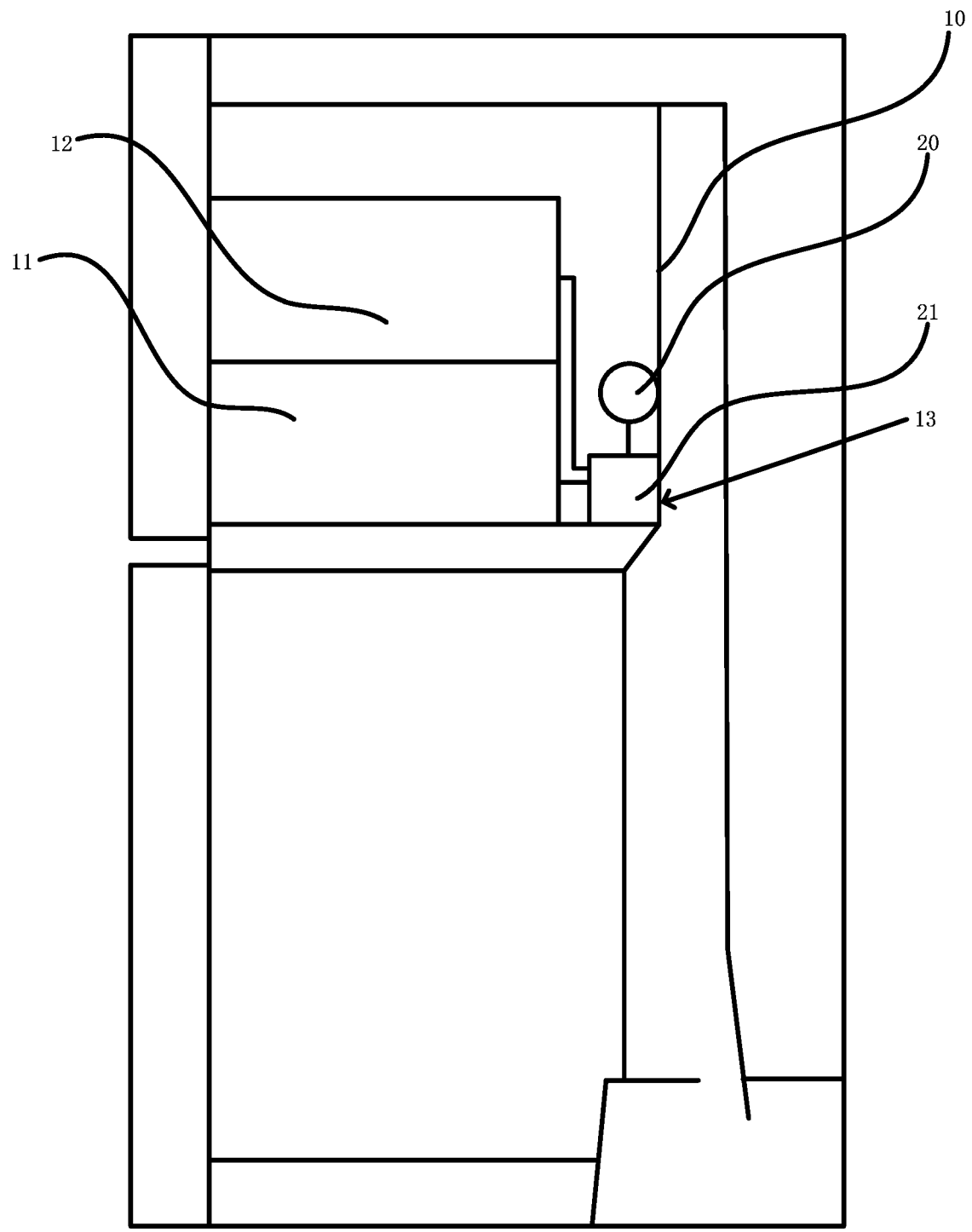
FIG. 1 is a schematic view of a refrigerating and freezing device according to one embodiment of the present invention.

An embodiment provides a refrigerating and freezing device first. FIG. 1 is a schematic view of a refrigerating and freezing device according to one embodiment of the present invention. The refrigerating and freezing device may be such refrigerating devices as a refrigerator and a refrigerating cabinet, and comprises a cabinet body 10 and a nitrogen generation device 13. A storage compartment is provided in the cabinet body 10. A first sealed space 11 and a second sealed space 12 are disposed in the storage compartment. Nitrogen is charged into the first sealed space 11 and used for freshness preservation of food therein. The first sealed space 11 may be configured to store such food as vegetables and fruits. An oxygen-enriched gas is charged into the second sealed space 12 and used for keeping the bioactivity of food therein. The second sealed space 12 may be configured to store such aquatic products as fish.

The nitrogen generation device 13 in the embodiment utilizes a PSA (Pressure Swing Adsorption) nitrogen generation method to remove oxygen in the air so as to generate pure nitrogen. PSA is a main technique for gas generation at present, and particularly means that a mixed gas is pressurized at a constant temperature, an adsorbent is utilized to adsorb residual impure gases to obtain a relatively purer gas, and the impure gases in the adsorbent are desorbed by a decompression (vacuumizing) or atmospheric pressure method, such that the adsorbent may be reused. The carbon molecular sieves are common adsorbents for realizing oxygen-nitrogen separation and extracting nitrogen from air at present. On the condition of the same adsorption pressure, the carbon molecular sieves adsorb much more oxygen than nitrogen. By use of this principle, the PSA nitrogen generation method takes air as a raw material, applies a PSA technique, and utilizes preferential adsorption of the carbon molecular sieves to oxygen and nitrogen to separate nitrogen from oxygen in the air, thus generating pure nitrogen. According to the nitrogen generation device 13 in the embodiment, residual air obtained after nitrogen generation, namely an oxygen-enriched gas, is charged into the second sealed space to keep the bioactivity of food therein and to guarantee the cleanliness of food.

The nitrogen generation device 13 in the embodiment comprises an adsorption device 21 and an air compressor 20 that supplies compressed air for the adsorption device 21 in a controlled manner. The adsorption device 21 is communicated with the first sealed space 11 or the second sealed space 12 in a controlled manner. The nitrogen generation device 13 is configured to supply the compressed air for the adsorption device 21, communicate the adsorption device 21 with the first sealed space 11 so as to enable the adsorption device 21 to prepare nitrogen and to provide the prepared nitrogen for the first sealed space 11, and communicate the adsorption device 21 with the second sealed space 12 after stopping supplying the compressed air for the adsorption device 21 so as to enable the adsorption device 21 to desorb the oxygen-enriched gas and to provide the desorbed oxygen-enriched gas for the second sealed space 12.

The air compressor 20 of the nitrogen generation device 13 supplies the compressed air for the adsorption device 21 at intervals. In the period that the air compressor 20 supplies the compressed air for the adsorption device 21, the adsorption device 21 adsorbs the oxygen-enriched gas in the air and charges the residual nitrogen into the first sealed space 11. In the period that the air compressor 20 stops supplying the compressed air for the adsorption device 21, the adsorption device 21 desorbs the oxygen-enriched gas and charges the oxygen-enriched gas into the second sealed space 12.

Figure 2:
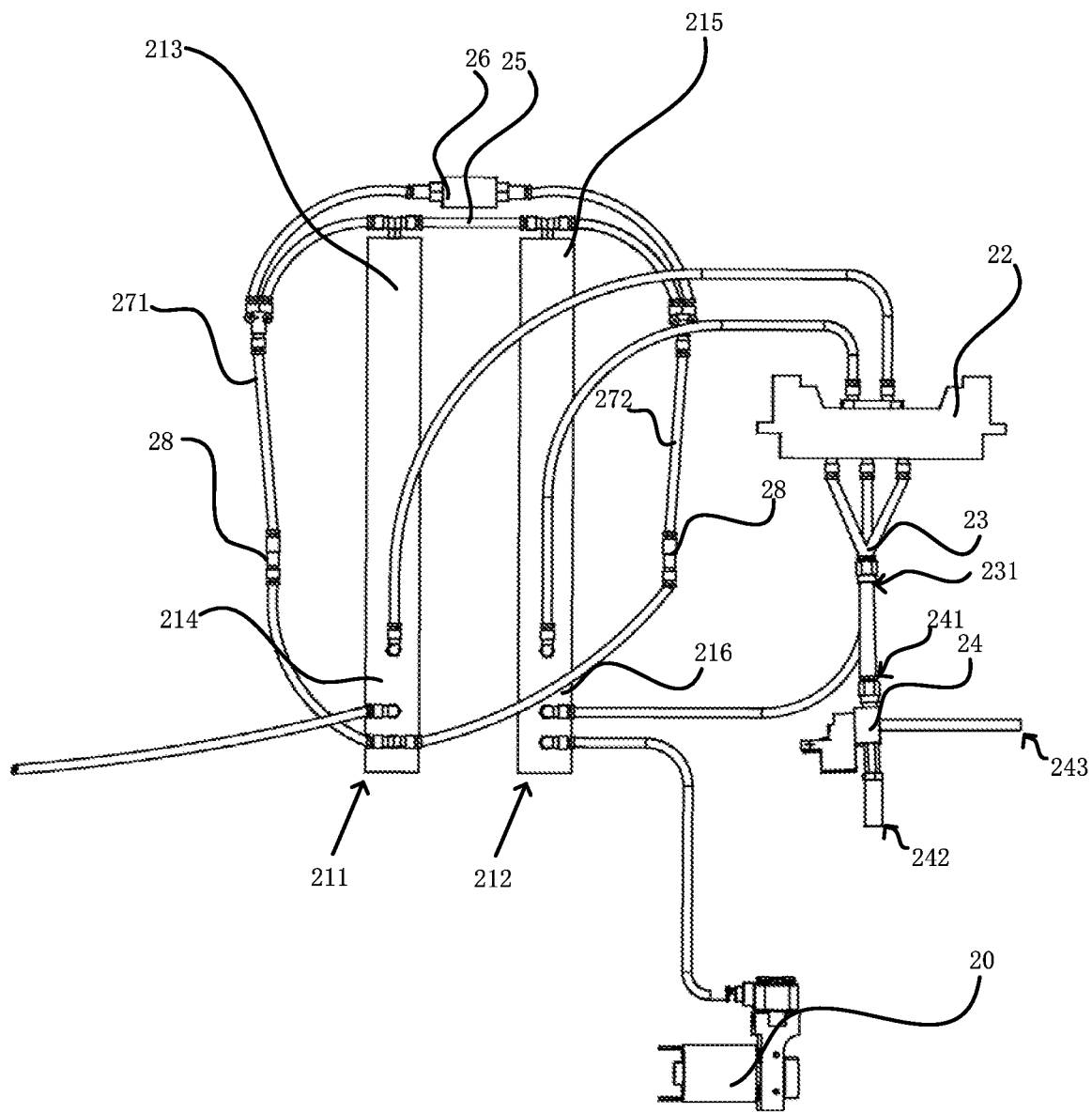
FIG. 2 is a schematic view of a nitrogen generation device of a refrigerating and freezing device according to one embodiment of the present invention.

FIG. 2 is a schematic view of a nitrogen generation device 13 of a refrigerating and freezing device according to one embodiment of the present invention. The adsorption device 21 in the embodiment further comprises a first barrel 211 and a second barrel 212. A first adsorption room 213 and a nitrogen room 214 that are isolated from each other are provided in the first barrel 211. The nitrogen room 214 is communicated with the first sealed space 11. A second adsorption room 215 and an air room 216 that are isolated from each other are provided in the second barrel 212. The air compressor 20 is communicated with the air room 216 through an air inlet pipe so as to supply the compressed air for the air room 216 in a controlled manner. Carbon molecular sieves are disposed in the first adsorption room 213 and the second adsorption room 215. The air room 216 alternately supplies the compressed air for the first adsorption room 213 and the second adsorption room 215 in a controlled manner. When either of the first adsorption room 213 and the second adsorption room 215 adsorbs the oxygen-enriched gas to prepare nitrogen, the other thereof desorbs the carbon molecular sieves which have finished adsorption. The adsorption room that prepares the nitrogen is communicated with the nitrogen room 214. The adsorption room that performs desorption is communicated with the second sealed space 12. For example, when the air compressor 20 supplies the compressed air for the first adsorption room 213, the air pressure in the first adsorption room 213 rises. The carbon molecular sieves in the first adsorption room 213 adsorb the oxygen-enriched gas in the air. The residual nitrogen is input into the nitrogen room 214. Then, the nitrogen room 214 inputs the nitrogen into the first sealed space 11. Meanwhile, the air pressure in the second adsorption room 215 is reduced. The carbon molecular sieves in the second adsorption room 215 desorb the adsorbed oxygen-enriched gas and supply the desorbed gas for the second sealed space 12. According to the nitrogen generation device 13 in the embodiment, the first adsorption room 213 and the nitrogen room 214 are integrated into the first barrel 211, and the second adsorption room 215 and the air room 216 are integrated into the second barrel 212. Thus, compared with a traditional nitrogen generation device 13, the nitrogen generation device 13 in the embodiment is simplified in structure and miniaturized.

Figure 3:
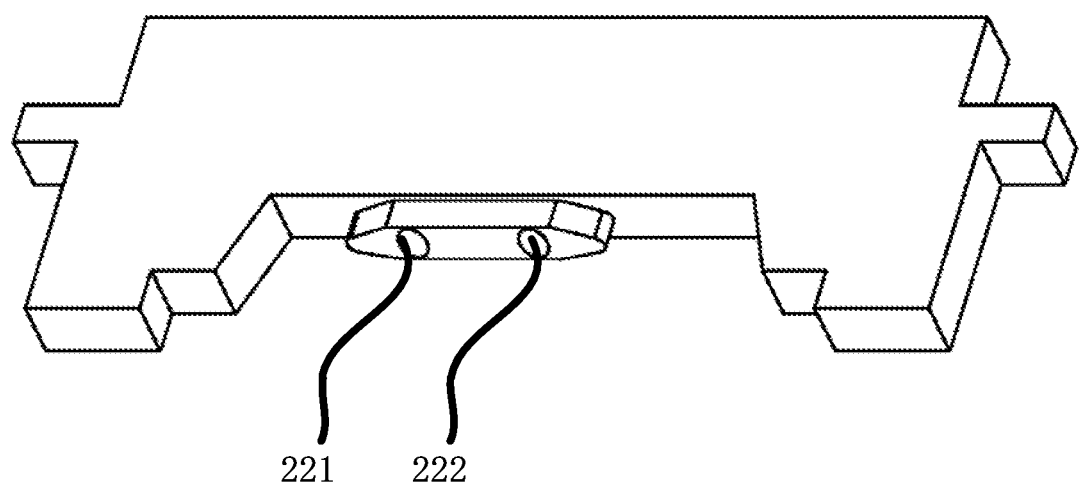
FIG. 3 is a directional schematic view of a gas path reversing valve of a refrigerating and freezing device according to one embodiment of the present invention.
Figure 4:
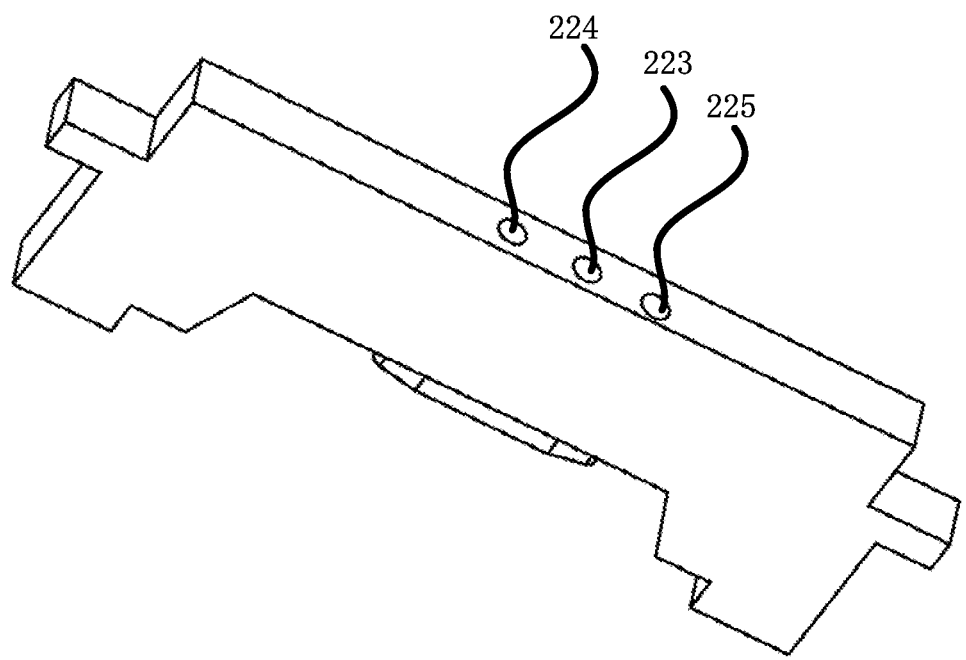
FIG. 4 is a schematic view of a gas path reversing valve of a refrigerating and freezing device viewed from another direction according to one embodiment of the present invention.

The nitrogen generation device 13 in the embodiment further comprises a gas path reversing valve 22. FIG. 3 is a directional schematic view of a gas path reversing valve 22 of a refrigerating and freezing device according to one embodiment of the present invention. FIG. 4 is a schematic view of a gas path reversing valve 22 of a refrigerating and freezing device viewed from another direction according to one embodiment of the present invention. The gas path reversing valve 22 is provided with five gas delivery ports. A first gas delivery port 221 is communicated with the first adsorption room 213. A second gas delivery port 222 is communicated with the second adsorption room 215. A third gas delivery port 223 is communicated with the air room 216. The gas path reversing valve 22 is further configured to that the third gas delivery port 223 is alternately communicated with the first gas delivery port 221 and the second gas delivery port 222. When the third gas delivery port 223 is communicated with the first gas delivery port 221, a fourth gas delivery port 224 is communicated with the second gas delivery port 222, the air room 216 supplies the compressed air for the first adsorption room 213, and the oxygen-enriched gas desorbed by the second adsorption room 215 is discharged through the fourth gas delivery port 224. When the third gas delivery port 223 is communicated with the second gas delivery port 222, a fifth gas delivery port 225 is communicated with the first gas delivery port 221, the air room 216 supplies the compressed air for the second adsorption room 215, and the oxygen-enriched gas desorbed by the first adsorption room 213 is discharged through the fifth gas delivery port 225.

Figure 5:
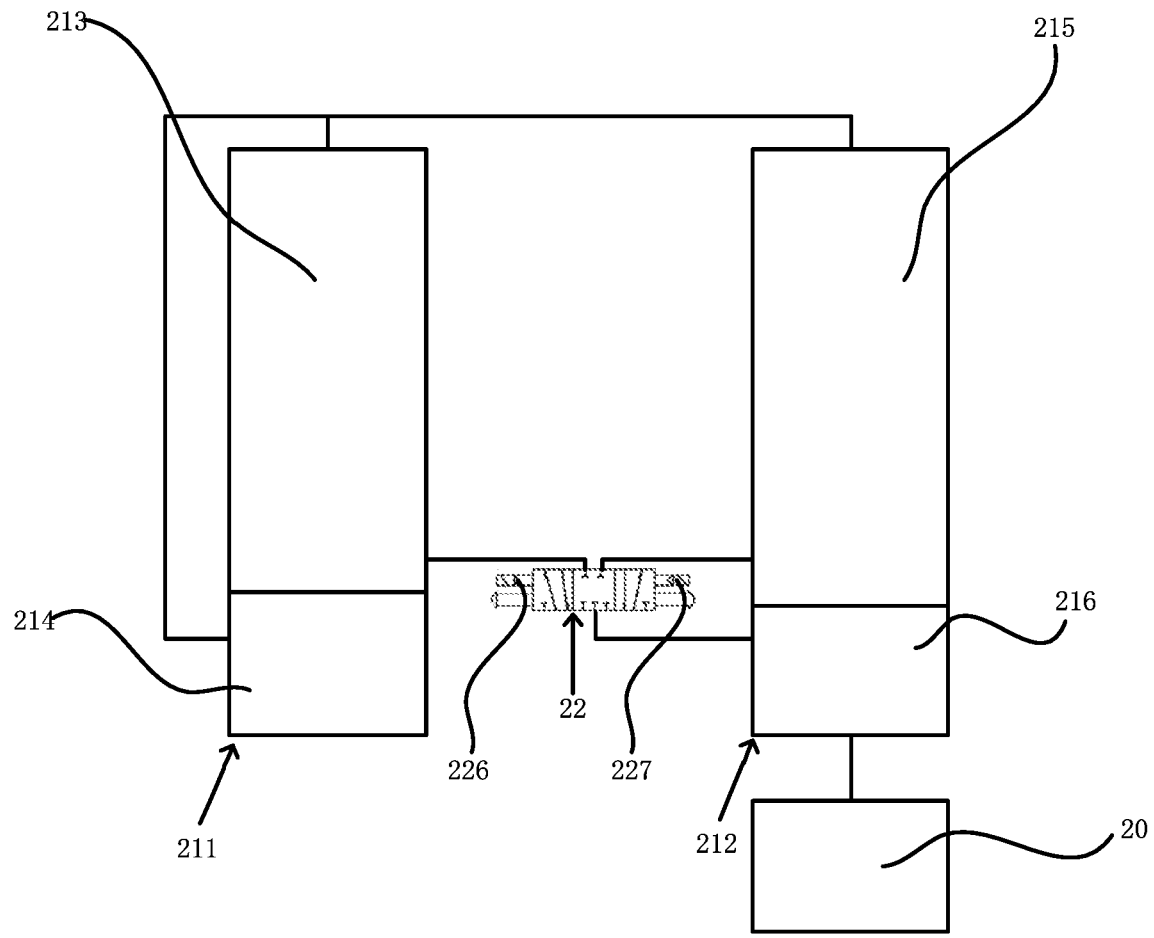
FIG. 5 is a schematic view of a control principle of a gas path reversing valve of a refrigerating and freezing device according to one embodiment of the present invention.

The gas path reversing valve 22 in the embodiment is a three-position five-way solenoid valve. FIG. 5 is a schematic view of a control principle of a gas path reversing valve of a refrigerating and freezing device according to one embodiment of the present invention. The gas path reversing valve 22 is provided with a first coil 226 and a second coil 227. When the first coil 226 is electrified, the third gas delivery port 223 is communicated with the first gas delivery port 221, and the fourth gas delivery port 224 is communicated with the second gas delivery port 222. Air enters the first adsorption room 213 from the air room 216, so that the air pressure in the first adsorption room 213 rises. The carbon molecular sieves adsorb the oxygen-enriched gas. Meanwhile, the air room 216 stops providing air for the second adsorption room 215, so that the air pressure in the second adsorption room 215 is reduced. The second adsorption room 215 starts for desorption. The oxygen-enriched gas desorbed by the second adsorption room 215 enters the gas path reversing valve 22 through the second gas delivery port 222 and is discharged through the fourth gas delivery port 224 at last. When the second coil 227 is electrified, this communicating mode is changed correspondingly. That is, the first adsorption room 213 performs desorption, and the second adsorption room 215 performs adsorption, which will not be repeated herein. When both of the first coil and the second coil are powered off, the first gas delivery port 221 and the second gas delivery port 222 are closed, and the air room 216 no longer supplies air for the first adsorption room 213 and the second adsorption room 215.

The nitrogen generation device 13 in the embodiment further comprises a three-way pipe 23 communicated with the fourth gas delivery port 224 and the fifth gas delivery port 225 and configured to merge the two gas delivery ports into an oxygen-enriched gas discharge port 231. The oxygen-enriched gas generated by the nitrogen generation device 13 in the embodiment is alternatively discharged through the fourth gas delivery port 224 and the fifth gas delivery port 225. The three-way pipe 23 collects oxygen discharged through the two gas delivery ports together. The collected oxygen is discharged through the oxygen-enriched gas discharge port 231.

The nitrogen generation device 13 in the embodiment further comprises a three-way solenoid valve 24 provided with three vents. A first vent 241 is communicated with the oxygen-enriched gas discharge port 231 through an oxygen-enriched gas output pipe. A second vent 242 is communicated with the second sealed space 12. A third vent 243 is communicated with outside air of the refrigerating and freezing device. The first vent 241 is selectively communicated with the second vent 242 or the third vent 243. An oxygen-enriched gas is conveyed into the second sealed space 12 when the first vent 241 is communicated with the second vent 242. The oxygen-enriched gas is discharged to the outside air when the first vent 241 is communicated with the third vent 243.

According to the refrigerating and freezing device in the embodiment, the oxygen-enriched gas generated by the nitrogen generation device 13 may be selectively charged into the second sealed space 12 or the outside air of the refrigerating and freezing device. When the second vent 242 is communicated with the interior of the second sealed space 12, and the first vent 241 of the three-way solenoid valve 24 is communicated with the second vent 242, the oxygen-enriched gas is discharged through the second vent 242 and input into the second sealed space 12. When the third vent 243 of the three-way solenoid valve 24 is communicated with the outside of the refrigerating and freezing device, and the first vent 241 is communicated with the third vent 243, the oxygen-enriched gas is discharged into the outside air through the third vent 243. When the oxygen-enriched gas is discharged into the outside air, the concentration of oxygen in a room of a user may be increased. Thus, the comfort degree of the user is improved.

The nitrogen generation device 13 further comprises a connecting pipe 25 and a pressure equalizing valve 26. The connecting pipe 25 is communicated between the first adsorption room 213 and the second adsorption room 215. The pressure equalizing valve 26 is connected in series with the connecting pipe 25 and configured to unblock the connecting pipe 25 when either of the first adsorption room 213 and the second adsorption room 215 stops adsorption and prepares to desorb, such that air pressures inside the first adsorption room 213 and the second adsorption room 215 are equalized. For example, when the first adsorption room 213 finishes adsorption and prepares for desorption, and correspondingly, the second adsorption room 215 finishes desorption and prepares for adsorption, the pressure equalizing valve 26 is switched on, and accordingly, the first adsorption room 213 and the second adsorption room 215 are communicated. Since the first adsorption room 213 is in a high-pressure state and the second adsorption room 215 is in a low-pressure state, the gas in the first adsorption room 213 rapidly flows into the second adsorption room 215, and accordingly, the air pressures in the two adsorption rooms are made the same. The air pressure in the first adsorption room 213 is quickly lowered to facilitate follow-up desorption. The air pressure in the second adsorption room 215 quickly rises to facilitate follow-up oxygen adsorption.

The nitrogen generation device 13 further comprises a first gas outlet pipe 271, a second gas outlet pipe 272 and two one-way valves 28. The first gas outlet pipe 271 is communicated between the first adsorption room 213 and the nitrogen room 214. The second gas outlet pipe 272 is communicated between the second adsorption room 215 and the nitrogen room 214. The first adsorption room 213 and the second adsorption room 215 input the generated nitrogen into the nitrogen room 214 through the above-mentioned two pipes. The two one-way valves 28 are respectively disposed on the first gas outlet pipe 271 and the second gas outlet pipe 272 to allow the gas to unidirectionally flow from the first adsorption room 213 or the second adsorption room 215 toward the nitrogen room 214 so as to prevent the gas in the nitrogen room 214 from backflow.

The nitrogen generation device 13 further comprises an oil-water separator disposed on the air inlet pipe to filter the air that enters the air room 216. In some alternative embodiments, an air intake filter is added to a suction end of the air compressor 20 to remove impurities in the air and to prevent the carbon molecular sieves from loss of activity.

In some other embodiments, the first barrel 211 and the second barrel 212 are disposed in the cabinet body 10 of the refrigerating and freezing device side by side. One end of the first adsorption room 213 and one end of the second adsorption room 215 are disposed in the same direction. One end of the air room 216 and one end of the nitrogen room 214 are disposed in another direction, thus facilitating piping and wiring.

The embodiment provides the refrigerating and freezing device. The first sealed space 11 and the second sealed space 12 are disposed in a storage space inside the refrigerating and freezing device. The refrigerating and freezing device is further provided with the nitrogen generation device 13. The nitrogen generation device 13 comprises the adsorption device 21 and is configured to: supply the compressed air for the adsorption device 21, communicate the adsorption device 21 with the first sealed space 11 so as to enable the adsorption device 21 to prepare nitrogen and to provide the prepared nitrogen for the first sealed space 11, and communicate the adsorption device 21 with the second sealed space 12 after stopping supplying the compressed air for the adsorption device 21 so as to enable the adsorption device 21 to desorb the oxygen-enriched gas and to provide the desorbed oxygen-enriched gas for the second sealed space 12. According to the refrigerating and freezing device, the oxygen-enriched gas is supplied for the second sealed space 12 to increase the content of oxygen in the second sealed space 12. Thus, the refrigerating and freezing device may guarantee the bioactivity of food in the second sealed space 12.

In addition, as the nitrogen is charged into the first sealed space 11, the freshness preservation capability of the first sealed space 11 is improved. The nitrogen produced by the nitrogen generation device 13 and the residual oxygen-enriched gas are respectively used for freshness preservation and life keeping of the refrigerating and freezing device. The function of the nitrogen generation device 13 is fully utilized. The raw material, namely air, is saved.

Further, according to the nitrogen generation device 13 of the refrigerating and freezing device in the embodiment, the first adsorption room 213 and the nitrogen room 214 are integrated into the first barrel 211, and the second adsorption room 215 and the air room 216 are integrated into the second barrel 212, such that the structure of the nitrogen generation device 13 is simplified. Since the main body of the whole nitrogen generation device 13 consists of the two barrels only, the nitrogen generation device 13 is miniaturized to be conveniently disposed in a storage device.

So far, those skilled in the art should realize that although the present description illustrates and describes various exemplary embodiments of the present invention, many other modifications or amendments conforming to the principle of the present invention can be determined directly or derived based on the content disclosed by the present invention without departing from the spirit and scope of the present invention. Therefore, the scope of the present invention should be understood and considered to have covered all these modifications or amendments.

What is claimed is:

1. A refrigerating and freezing device, comprising:
a cabinet body in which a storage compartment is provided, a first sealed space and a second sealed space being formed in the storage compartment; and
a nitrogen generation device comprising an adsorption device and an air compressor, wherein the air compressor supplies compressed air for the adsorption device in a controlled manner, the adsorption device is communicated with the first sealed space or the second sealed space in a controlled manner, and the nitrogen generation device is configured to:
supply the compressed air for the adsorption device, communicate the adsorption device with the first sealed space so as to enable the adsorption device to prepare nitrogen and to provide the prepared nitrogen for the first sealed space; and
communicate the adsorption device with the second sealed space after stopping supplying the compressed air for the adsorption device so as to enable the adsorption device to desorb an oxygen-enriched gas and to provide the desorbed oxygen-enriched gas for the second sealed space,
wherein the adsorption device further comprises:
a first barrel in which a first adsorption room and a nitrogen room that are isolated from each other are provided, and the nitrogen room being communicated with the first sealed space; and
a second barrel in which a second adsorption room and an air room that are isolated from each other are provided, wherein:
the air compressor is communicated with the air room through an air inlet pipe so as to supply the compressed air for the air room in a controlled manner;
carbon molecular sieves are disposed in the first adsorption room and the second adsorption room; the air room alternately supplies the compressed air for the first adsorption room and the second adsorption room in a controlled manner; when one of the first adsorption room and the second adsorption room adsorbs the oxygen-enriched gas to prepare nitrogen, the other thereof desorbs the carbon molecular sieves which have finished adsorption; the adsorption room that prepares the nitrogen is communicated with the nitrogen room; and the adsorption room that performs desorption is communicated with the second sealed space.

2. The refrigerating and freezing device according to claim 1, wherein the nitrogen generation device further comprises:

a gas path reversing valve provided with five gas delivery ports, a first gas delivery port being communicated with the first adsorption room, a second gas delivery port being communicated with the second adsorption room, a third gas delivery port being communicated with the air room, wherein the gas path reversing valve is further configured to that the third gas delivery port is alternately communicated with the first gas delivery port and the second gas delivery port; when the third gas delivery port is communicated with the first gas delivery port, a fourth gas delivery port is communicated with the second gas delivery port, the air room supplies the compressed air for the first adsorption room, and the oxygen-enriched gas desorbed by the second adsorption room is discharged through the fourth gas delivery port; and when the third gas delivery port is communicated with the second gas delivery port, a fifth gas delivery port is communicated with the first gas delivery port, the air room supplies the compressed air for the second adsorption room, and the oxygen-enriched gas desorbed by the first adsorption room is discharged through the fifth gas delivery port.

3. The refrigerating and freezing device according to claim 2, wherein the nitrogen generation device further comprises:
a three-way pipe communicated with the fourth gas delivery port and the fifth gas delivery port and configured to merge the two gas delivery ports into an oxygen-enriched gas discharge port.

4. The refrigerating and freezing device according to claim 3, wherein the nitrogen generation device further comprises:
a three-way solenoid valve provided with three vents, a first vent being communicated with the oxygen-enriched gas discharge port through an oxygen-enriched gas output pipe, a second vent being communicated with the second sealed space, and a third vent being communicated with outside air of the refrigerating and freezing device, wherein:
the first vent is selectively communicated with the second vent or the third vent, the oxygen-enriched gas is conveyed into the second sealed space when the first vent is communicated with the second vent, and the oxygen-enriched gas is discharged to the outside air when the first vent is communicated with the third vent.

5. The refrigerating and freezing device according to claim 1, wherein the nitrogen generation device further comprises:
a connecting pipe communicated with the first adsorption room and the second adsorption room; and
a pressure equalizing valve connected in series with the connecting pipe and configured to unblock the connecting pipe when one of the first adsorption room and the second adsorption room stops adsorption and prepares to desorb, such that air pressures inside the first adsorption room and the second adsorption room are equalized.

6. The refrigerating and freezing device according to claim 1, wherein the nitrogen generation device further comprises:
a first gas outlet pipe communicated between the first adsorption room and the nitrogen room;
a second gas outlet pipe communicated between the second adsorption room and the nitrogen room; and
two one-way valves respectively disposed on the first gas outlet pipe and the second gas outlet pipe and configured to allow a gas to unidirectionally flow toward the nitrogen room from the first adsorption room or the second adsorption room, such that the gas in the nitrogen room is prevented from backflow.

7. The refrigerating and freezing device according to claim 1, wherein the nitrogen generation device further comprises:
an oil-water separator disposed on the air inlet pipe and configured to filter the air that enters the air room.

8. The refrigerating and freezing device according to claim 1, wherein:
the first barrel and the second barrel are disposed in the refrigerating and freezing device side by side, and one end of the first adsorption room and one end of the second adsorption room are disposed in the same direction.

* * * * *